United States Patent
Anand et al.

(10) Patent No.: US 9,596,173 B2
(45) Date of Patent: Mar. 14, 2017

(54) METHOD AND SYSTEM FOR TRAFFIC PATTERN GENERATION IN A SOFTWARE-DEFINED NETWORKING (SDN) SYSTEM

(71) Applicant: Telefonaktiebolaget L M Ericsson (publ), Stockholm (SE)

(72) Inventors: Prashant Anand, Bangalore (IN); Vinayak Joshi, Bangalore (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 123 days.

(21) Appl. No.: 14/682,276

(22) Filed: Apr. 9, 2015

(65) Prior Publication Data
US 2016/0301601 A1 Oct. 13, 2016

(51) Int. Cl.
| H04L 12/721 | (2013.01) |
| H04L 27/06 | (2006.01) |
| H04L 12/741 | (2013.01) |
| H04L 12/713 | (2013.01) |
| H04L 29/06 | (2006.01) |

(52) U.S. Cl.
CPC ............ *H04L 45/38* (2013.01); *H04L 45/586* (2013.01); *H04L 69/22* (2013.01)

(58) Field of Classification Search
None
See application file for complete search history.

(56) References Cited

U.S. PATENT DOCUMENTS

| 2013/0010600 | A1  | 1/2013  | Jocha et al. |
| 2014/0371880 | A1  | 12/2014 | Lee et al. |
| 2015/0023147 | A1* | 1/2015  | Lee ............. H04L 45/38 370/216 |
| 2015/0249572 | A1* | 9/2015  | Mack-Crane ........ H04L 45/38 709/222 |
| 2016/0218957 | A1* | 7/2016  | Liang ................. H04L 45/64 370/254 |

OTHER PUBLICATIONS

International Search Report and the Written Opinion for Application No. PCT/IB2016/051990, mailed Jun. 24, 2016, 14 pages.

(Continued)

*Primary Examiner* — Robert C Scheibel
*Assistant Examiner* — Saba Tsegaye
(74) *Attorney, Agent, or Firm* — Nicholson De Vos Webster & Elliott LLP

(57) ABSTRACT

In one embodiment, a packet from a SDN controller is received at a network device. The packet is processed according to a flow table, which contains at least two entries that each matches the packet. The entries contain instructions to forward the packet according to group tables, and the entries are to expire after different time durations. The packet is to be forwarded according to a first group table and gets duplicated into two: one is transmitted to a first packet queue that transmits packets in a fixed interval to a loopback port that loops back the packets, while the other is forwarded to a first packet buffer that randomly drops packets at a probability prior to transmitting the remaining packets to generate a traffic pattern. The packet is received from the loopback port, and then forwarded according to a second group table to generate another traffic pattern.

20 Claims, 6 Drawing Sheets

(56) References Cited

OTHER PUBLICATIONS

Xie An et al., "Designing a disaster-resilient network with software defined networking", 2014 IEEE 22nd International Symposium of Quality of Service, May 26, 2014, 9 pages.
"OpenFlow Switch Specification", Open Networking Foundation, Version 1.3.1 (Wire Protocol 0x04), Sep. 6, 2012, pp. 1-128.
"OpenFlow Switch Specification", Open Networking Foundation, Version 1.3.4 (Protocol version 0x04), Mar. 27, 2014, pp. 1-171.
Anand, et al., "Systems and Methods for High Throughput Traffic Pattern Generation", filed Sep. 27, 2013, pp. 1-21.
J. Postel, "User Datagram Protocol," Aug. 28, 1980, 3 pages, RFC: 768.
"Transmission Control Protocol, DARPA Internet Program Protocol Specification," Sep. 1981, 91 pages, RFC: 793, Information Sciences Institute, University of Southern California, Marina del Rey, California.
T. Socolofsky, et al., "A TCP/IP Tutorial," Jan. 1991, 28 pages, Network Working Group, Request for Comments: 1180.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
B. Fenner, et al., "Management Information Base for the User Datagram Protocol (UDP)," Jun. 2005, 19 pages, Network Working Group, Request for Comments: 4113, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
E. Rosen, et al., "BGP/MPLS IP Virtual Private Networks (VPNs)," Feb. 2006, 47 pages, Network Working Group, Request for Comments: 4364, The Internet Society.
J. Babiarz, et al., "Configuration Guidelines for DiffServ Service Classes," Aug. 2006, 57 pages, Network Working Group, Request for Comments: 4594, The Internet Society.
K. Kompella, et al., "Virtual Private LAN Service (VPLS) Using BGP for Auto-Discovery and Signaling," Jan. 2007, 28 pages, Network Working Group, Request for Comments: 4761, The IETF Trust.
M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.
F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

\* cited by examiner

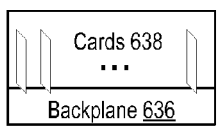
Fig. 6A
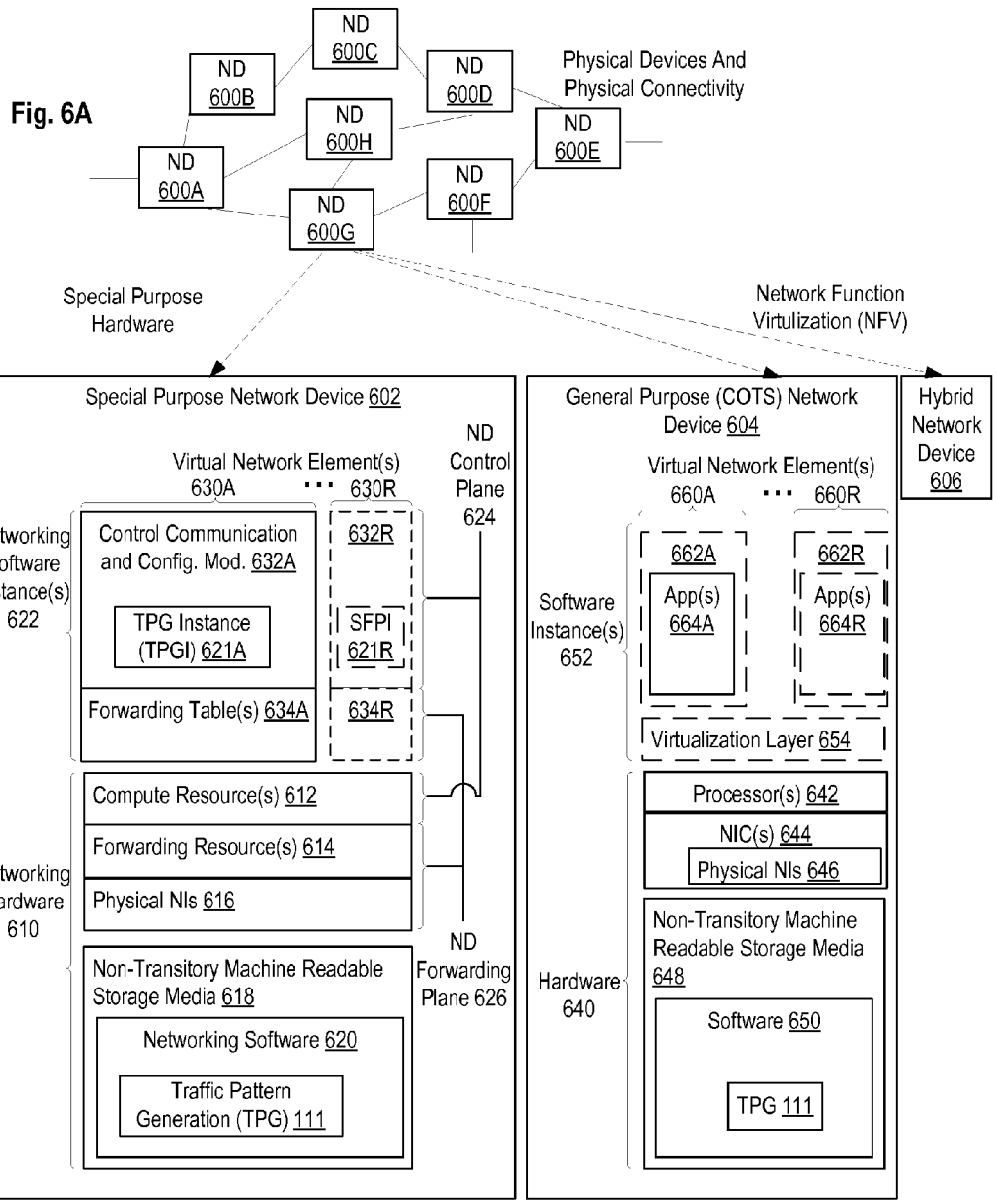

METHOD AND SYSTEM FOR TRAFFIC PATTERN GENERATION IN A SOFTWARE-DEFINED NETWORKING (SDN) SYSTEM

FIELD

The embodiments of the invention are related to the field of networking. More specifically, the embodiments of the invention relate to a method and system for traffic pattern generation in a software-defined networking (SDN) system.

BACKGROUND

In order to optimize network performance and improve network utilization, it is desirable to understand characteristics of traffic transmitted through a data network. A number of mathematical models are used to model the statistical properties of real world network traffic. Through the models, a set of traffic patterns may be generated to mimic the real world network traffic, and the set of traffic patterns can be used to analyze and optimize network performance such as providing ways to handle congestion and estimate capacity.

One basic model for a traffic source is the Bernoulli source model. The Bernoulli source model describes a non-correlated packet source, i.e., new packets are generated based on probabilities that are independent of any previous event. The load offered by a Bernoulli traffic source can be specified by p, a probability of a packet arrival in a given time interval, which is independent of arrivals in previous time intervals. Thus, the probability of arrival can be denoted as Prob (1 arrival)=p, and the probability of no arrival can be denoted as Prob (0 arrival)=1−p. The Bernoulli source model is a memoryless process. That is, knowledge of a past arrival does not help predict a current or future arrival.

Another model for traffic source is an On-Off source model. In the On-Off source model, an On-Off source operates as a two state Markov modulated process (MMP). In the ON state, the source generates a packet with a probability. In the OFF state, no packets are generated. Two parameters are needed for the On-Off traffic source: an offered load and an average burst length. An MMP changes the injection process for bursty traffic. In an MMP, the rate of a Bernoulli injection process is modulated by a current state of a Markov chain.

FIG. 1 illustrates a two state Markov traffic source model. A traffic source may be modeled using the ON and OFF states. In the ON state, the traffic source has an injection rate of $r_1$; in the OFF state, the traffic source has an injection rate of 0. The probability of transition from the OFF state to the ON state is a, and the probability of transition from the ON state to the OFF state is b. The two state Markov traffic source model represents a bursty injection process, where during bursts, injections occur with an overall rate of $r_1$ and random inter-packet delays; and outside the bursts, no injection is allowed. The average burst length is 1/b and the average time between two bursts is 1/a. The larger the ratio of b to a, the more intense is the traffic arrival during a burst period.

The two state Markov traffic model is a special case of Markov-based traffic models. In general, a Markov-based traffic model is represented as an n-state continuous time Markov process (the more the number of states, the more the variety of traffic patterns, rates, etc.). The n-state continuous time Markov process may be presented as $$M=\{M(t)\},\ t=0\ \text{to}\ \infty,$$

where the state space is $\{S_1, S_2, \ldots, S_n\}$. Thus, $$M(t) \in \{S_1, S_2, \ldots, S_n\}.$$

The Markov process M stays in state $S_i$ for an exponentially distributed holding time and then jumps to state $S_j$ with probability $P_{ij}$. More generally, all the state transitions are governed by a probability state matrix $P=[P_{ij}]$, where $P_{ij}$ represents the probability of transition from state i to state j. Using the Markov process, the probability of traffic arrival is determined by a specific state in which the Markov process M is in. For example, assume that while M is in state $S_k$, the probability of traffic arrivals is completely determined by k, and this holds true for every $1 \le k \le n$. When M undergoes a transition to, for example, state $S_j$, then a new probability takes effect for the duration of state $S_j$. The most commonly used Markov modulated process model is the Markov Modulated Poisson process (MMPP). In that case, the modulation mechanism simply stipulates that in the state $S_k$ of M, traffic arrivals occur according to a Poisson process at rate $\lambda_k$. As the state changes, so does the rate. These traffic source models above have been applied to traditional network equipment such as special purpose network devices (e.g., routers and switches). Yet, a new networking architecture, software-defined networking (SDN), is gaining popularity among carriers and enterprises, and SDN has specific features worth considering in applying traffic modeling.

The software-defined networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices.

SUMMARY

A method for generating a set of traffic patterns is disclosed. The method is implemented in a network device coupled to a software-defined networking (SDN) system, where the SDN system contains a SDN controller managing the network device. The method includes receiving a packet from the SDN controller and processing the packet according to a packet generation flow table that contains at least a first and a second flow table entry that each matches the packet. The first and second flow table entries contain instructions to forward the packet according to a first and a second group table respectively, and the first flow table entry is to expire after a first time duration and the second flow table entry is to expire after a second time duration longer than the first time duration. Additionally, the first flow table entry has a first priority and the second flow table entry has a second priority lower than the first priority. The method also includes forwarding the packet according to the first group table upon determining that the first flow table entry is an entry matching the packet with a highest priority and the first time duration is not expired. The method also includes duplicating the packet into two packets at the first group table, where one packet is transmitted to a first packet queue that transmits packets in a first fixed interval to a loopback port of the network device that loops back the packets, where the other packet is forwarded to a first packet buffer that randomly drops packets at a first probability prior to transmitting the remaining packets out of the network device. The packet is received from the loopback port, and the method continues with forwarding the packet according to the second group table upon determining that the second flow table entry is an entry matching the packet with a highest priority and the second time duration is not expired, and duplicating the packet into two packets at the second group table, where one packet is transmitted to a second packet queue that transmits packets in a second fixed interval to the loopback port, where the other packet is forwarded to a second packet buffer that randomly drops packets at a second probability prior to transmitting the remaining packets out of the network device.

A network device to generate a set of traffic patterns is disclosed. The network device is to be coupled to a software-defined networking system, where the SDN system contains a SDN controller managing the network device. The network device receives a packet from the SDN controller. The network device processes the packet according to a packet generation flow table that contains at least a first and a second flow table entry that each matches the packet. The first and second flow table entries contain instructions to forward the packet according to a first and a second group table respectively, where the first flow table entry is to expire after a first time duration and the second flow table is to expire after a second time duration longer than the first time duration, and where the first flow table entry has a first priority and the second flow table entry has a second priority lower than the first priority. The network device forwards the packet according to the first group table upon determining that the first flow table entry is an entry matching the packet with a highest priority and the first time duration is not expired. The network device duplicates the packet into two packets at the first group table, where one packet is transmitted to a first packet queue that transmits packets in a first fixed interval to a loopback port of the network device that loops back the packets, where the other packet is forwarded to a first packet buffer that randomly drops packets at a first probability prior to transmitting the remaining packets out of the network device. The network device receives the packet from the loopback port, and forwards the packet according to the second group table upon determining that the second flow table entry is an entry matching the packet with a highest priority and the second time duration is not expired. The network device then duplicates the packet into two packets at the second group table, where one packet is transmitted to a second packet queue that transmits packets in a second fixed interval to the loopback port, and where the other packet is forwarded to a second packet buffer that randomly drops packets at a second probability prior to transmitting the remaining packets out of the network device.

A non-transitory machine-readable storage medium for generating a set of traffic patterns is disclosed. The storage medium has instructions stored therein, which when executed by a processor, cause the processor to perform operations in an electronic device, the operations including receiving a packet from the SDN controller and processing the packet according to a packet generation flow table that contains at least a first and a second flow table entry that each matches the packet. The first and second flow table entries contain instructions to forward the packet according to a first and a second group table respectively, and the first flow table entry is to expire after a first time duration and the second flow table entry is to expire after a second time duration longer than the first time duration. Additionally, the first flow table entry has a first priority and the second flow table entry has a second priority lower than the first priority. The operations also include forwarding the packet according to the first group table upon determining that the first flow table entry is an entry matching the packet with a highest priority and the first time duration is not expired. The operations also include duplicating the packet into two packets at the first group table, where one packet is transmitted to a first packet queue that transmits packets in a first fixed interval to a loopback port of the network device that loops back the packets, where the other packet is forwarded to a first packet buffer that randomly drops packets at a first probability prior to transmitting the remaining packets out of the network device. The packet is received from the loopback port, and the operations continue with forwarding the packet according to the second group table upon determining that the second flow table entry is an entry matching the packet with a highest priority and the second time duration is not expired, and duplicating the packet into two packets at the second group table, where one packet is transmitted to a second packet queue that transmits packets in a second fixed interval to the loopback port, where the other packet is forwarded to a second packet buffer that randomly drops packets at a second probability prior to transmitting the remaining packets out of the network device.

Embodiments of the disclosed techniques provide ways to generate a set of traffic patterns in a SDN system. Through embodiments of the disclosed techniques, packets with a set of determined arrival rates can be generated at a set of determined intervals. The generated traffic patterns may be utilized to analyze and improve performance of the SDN system.

BRIEF DESCRIPTION OF THE DRAWINGS

The present invention is illustrated by way of example, and not by way of limitation, in the figures of the accompanying drawings in which like references indicate similar elements.

FIG. 6A illustrates connectivity between network devices (NDs) within an exemplary network, as well as three exemplary implementations of the NDs, according to some embodiments of the invention.

FIG. 6B illustrates an exemplary way to implement a special-purpose network device according to some embodiments of the invention.

DETAILED DESCRIPTION

Figure 1:
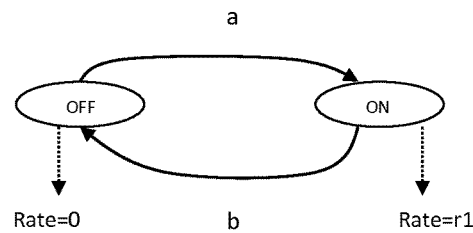
FIG. 1 illustrates a two state Markov traffic source model.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). As explained in more details herein below, a network element may be implemented in one or more network devices, and a network device may implement one or more network elements.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Network Performance Analysis in a SDN System

Traffic modeling can be used to analyze network performance. The analysis includes service level agreement (SLA) verification, which may be performed by a SLA analyzer that verifies that a service provider/carrier provides to a client a service according to a SLA between the parties with agreed-upon parameters. Network SLA verification involves evaluation of a network's Key Performance Indicators (KPIs) (bandwidth, jitter, latency and loss) against different traffic profiles (described by parameters such as traffic type, rate, pattern, etc.). These traffic profiles are the result of traffic flows generated by applications at a higher level.

In statistical classification, traffic flows may be identified based on their behaviors. A traffic flow behavior may be qualified by observing packet arrivals for the traffic flow belonging to a particular application type, and the traffic flow behavior may be compared to a known behavioral mode of the particular application type. The statistical characteristics of a traffic flow include a mean inter-packet delay, packet sizes, arrival pattern, traffic burst, etc. Mathematical traffic source models can be used to generate traffic flows with these statistical parameters, and such traffic sources can be used in SLA verification.

Figure 2:
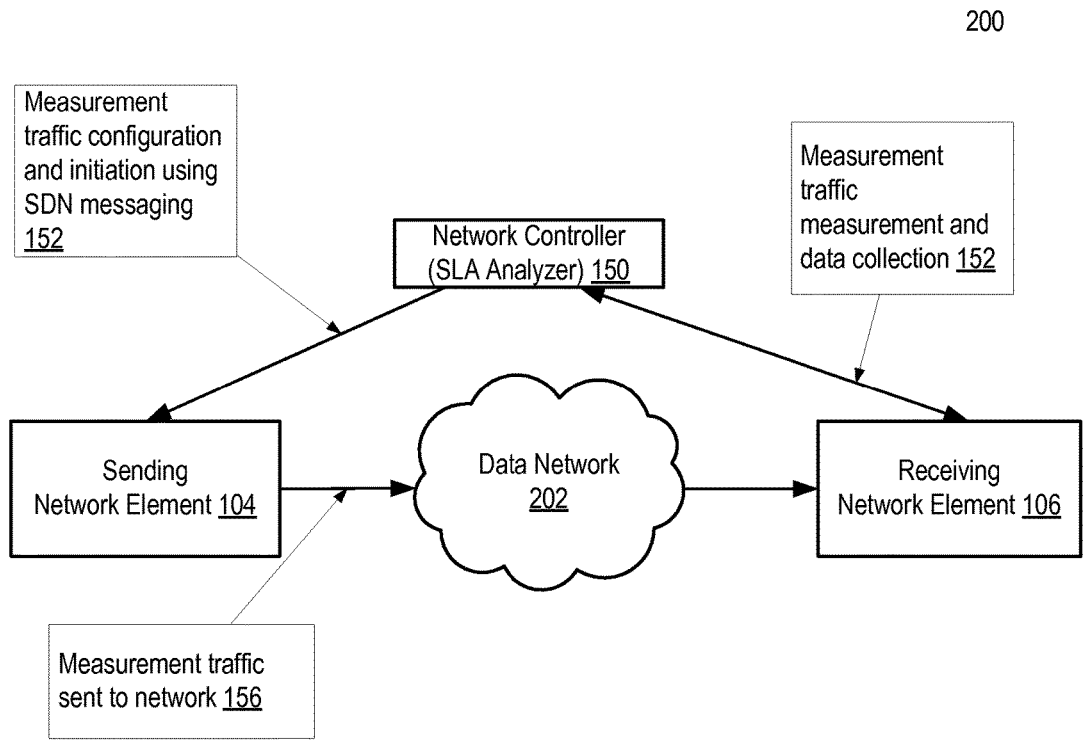
FIG. 2 illustrates an architecture of service level agreement (SLA) verification used in a SDN system according to one embodiment of the invention.

FIG. 2 illustrates an architecture of SLA verification used in a SDN system according to one embodiment of the invention. A network controller 150 manages network elements 104 and 106. The operations of a network controller and network elements are discussed in more details in relation to FIGS. 6A-F. Network controller 150 serves as a SLA analyzer to verify the SLA in a data network 202.

In order to perform the verification, the network controller 150 configures measurement traffic, and initiates the measurement traffic at reference 152. The configuration and initiation is performed through SDN messaging in one embodiment. For example, for a SDN system in compliance with the OpenFlow standards, the messaging may take the form of OpenFlow messages such as PACKET_IN and PACKET_OUT.

After the measurement traffic is initiated at the sending network element 104, the measurement traffic is sent to the data network 202 at reference 156. The measurement traffic includes packets following specific statistical characteristics of one or more desired traffic flows, each containing a traffic pattern. The data network 202 processes the packets of the measurement traffic, and the processed packets are received at the receiving network element 106. The network controller 150 interacts with the receiving network element 106 and performs measurements and collects data. The collected data are then analyzed and compared with the SLA agreed with the client, and it is then determined whether the SLA has been complied with. Within the process, the measurement traffic may be generated at the sending network element 104, according to a statistical traffic model. The disclosed techniques generate a set of traffic patterns according to a statistical traffic model at a network element of a SDN system such as the sending network element 104.

Initial Pattern Simulation

A MMPP/Bernoulli traffic source model may be created and run for a required duration of time by a pattern generator application. The Markov state transitions and the number of Poisson arrivals in each state may be captured in a table. Each entry in the table includes a state (S), a load factor ($\lambda$), and a number of packets to be generated (G). The table may represent state transition in a number of states such as $S_1$, $S_2$, ..., $S_n$. The pattern generator application may perform state transitions and have a sequence of m states where m≥n. The transition occurs across the states $S_1, S_2, \ldots, S_n$. Each state may take time $t_j$, where 1≤j≤m, and a required number of packets to be generated is specified in each state. The table below is an example for a set of traffic patterns where n=4 and m=10, with the load factors and the numbers of packets to be generated specified in different states in the sequence.

TABLE 1

A Set of Traffic Pattern

| Time (t) | State (S) | Load factor ($\lambda$) | Number of packets to be generated (G) |
|---|---|---|---|
| $t_1$ | $S_1$ | 0.5 | 50 |
| $t_2$ | $S_2$ | 0.1 | 60 |
| $t_3$ | $S_3$ | 0.3 | 40 |
| $t_4$ | $S_2$ | 0.1 | 10 |
| $t_5$ | $S_4$ | 0.9 | 9 |
| $t_{10}$ | $S_2$ | 0.1 | 6 |

It is to be noted that the time $t_m$ in the table is not an absolute time; rather, the time $t_m$ denotes separate time intervals for each state. Each table entry represents a traffic pattern within a set of traffic patterns to be generated. With the load factor and the time interval specified at each table entry, a packet train with a uniform inter-packet gap can be generated. From the uniformly generated packets, a random drop mechanism may be deployed to randomly drop packets to arrive at the number of required packets to be generated for a specific traffic pattern for a given table entry. For example, at state $S_1$, with the given load factor $\lambda=0.5$ and the time interval of $t_1$, it is calculated that 80 packets are supposed to be produced, and the 80 packets are supposed to be produced evenly, i.e., the inter-packet gap is constant between the packets. Since the number of packets generated is supposed to be only 50, 80−50=30 packets need to be dropped. For a statistical modeling, the dropping of the 30 packets within the time interval of $t_1$ may be performed randomly according to a probability so that only 50 remaining packets are transmitted to the data network as a packet train from the source traffic for the traffic pattern representing state $S_1$, which is the first traffic pattern of the set of traffic patterns including ten traffic patterns in this example.

The process of producing a packet train with a uniform inter-packet gap is generally referred to as traffic shaping. The further revision of the packet train through random packet drop may be implemented in a variety of ways, and a typical random drop mechanism deploys a type of random early detection (RED). The random drop of packets in a packet train enables the generated traffic pattern to comply with a required pattern as illustrated in the table entries above. Thus, Table 1 represents a set of traffic patterns to be generated, and the set of traffic patterns may be used to analyze network performance of a data network under test.

Traffic Pattern Generation in a SDN System

Figure 3:
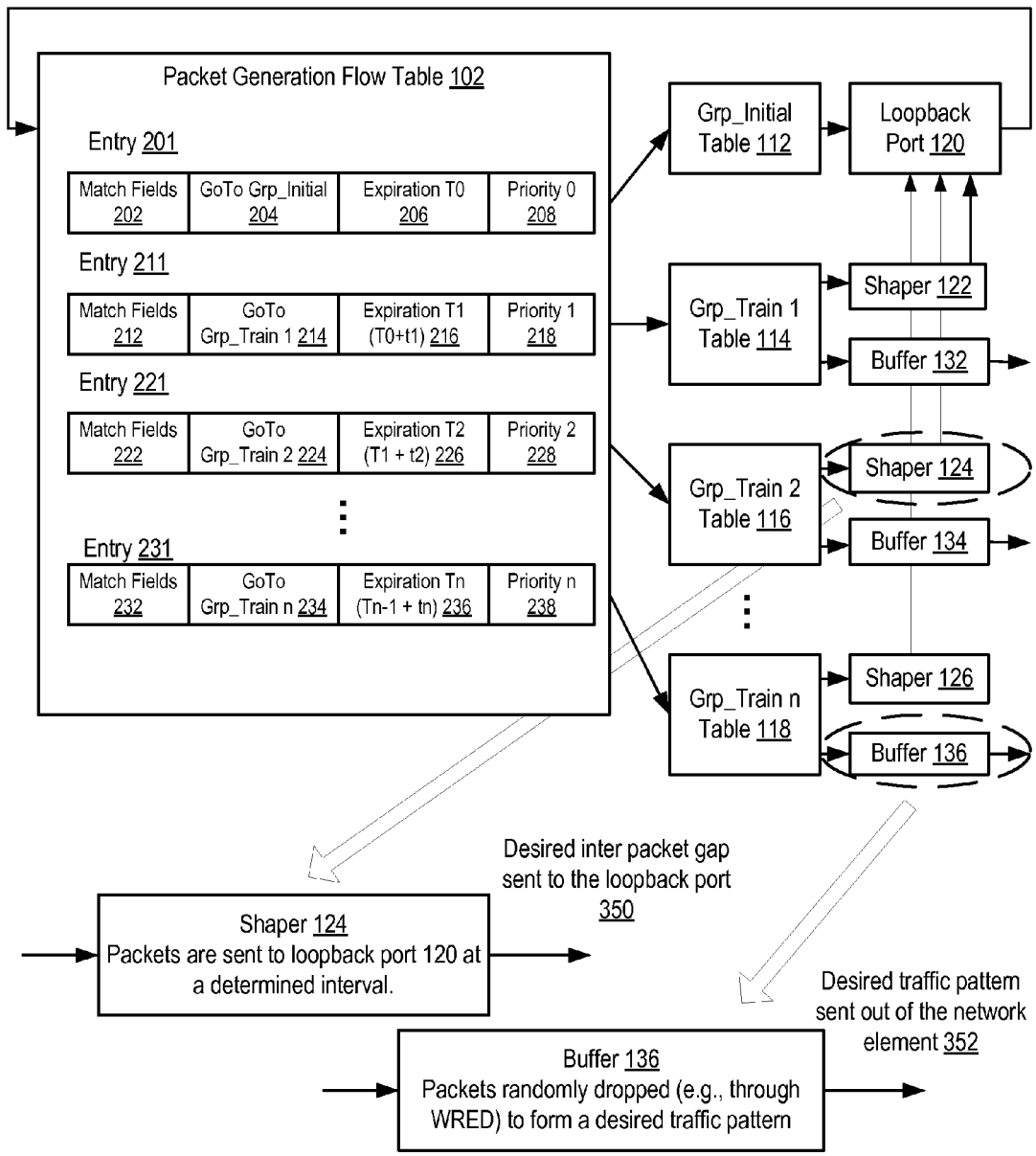
FIG. 3 illustrates the generation of a set of traffic patterns in a SDN system according to one embodiment of the invention.

The generation of a set of traffic patterns, including traffic shaping and random packet drop may be implemented in a SDN system. FIG. 3 illustrates the generation of a set of traffic patterns in a SDN system according to one embodiment of the invention. The illustrated functional boxes in FIG. 3 are implemented in a network element such as the sending network element 104 of a SDN system, where the network element is managed by a network controller such as the network controller 150.

The functional boxes include a packet generation flow table 102. The packet generation flow table 102 is created in the network element based on one or more requests from the network controller, in one embodiment. The network controller specifies a set of traffic patterns to be generated such as the one illustrated in Table 1 above. The set of traffic patterns may be received, for example, from an operator of the SDN system to test network performance of a network such as the data network 202. Based on the set of traffic patterns, the network controller sends the one or more requests to the network element.

The packet generation flow table 102 contains multiple entries for forwarding incoming packets. As known in the art, a flow table entry includes the following fields in one embodiment: (1) match fields to match an incoming packet; (2) an instructions field to instruct the matching incoming packet to perform one or more operations; (3) a timeout field to indicate when the flow table entry will expire; and (4) a priority field to indicate the priority of the flow table entry in matching the incoming packet. These fields may be ordered differently in different embodiments, and more fields may be added or removed in some or all flow table entries in some embodiments. For traffic pattern generation, these four fields may be utilized to generate a set of traffic patterns.

The packet generation flow table 102 contains entry 201, which includes match fields 202, an instruction field instructing a matching incoming packet to go to a group initial flow table 112 at reference 204, a timeout field indicating an expiration time being T0 at reference 206, and a priority field indicating a value zero that is the highest priority at reference 208. The packet generation flow table 102 also includes an entry 211, which includes match fields 212, an instruction field instructing a matching incoming packet to go to a group train 1 table 114 at reference 214, a timeout field indicating an expiration time being T1 (T1=T0+$t_1$) at reference 216, and a priority field indicating a value one that is the second highest priority at reference 218. Similarly, the packet generation flow table 102 includes an entry 221, which includes match fields 222, an instruction field instructing a matching incoming packet to go to a group train 2 table 116 at reference 224, a timeout field indicating an expiration time being T2 (T2=T1+$t_2$) at reference 226, and a priority field indicating a value two that is the third highest priority at reference 228. The packet generation flow table 102 may contain more entries, which are represented by an entry 231, which includes match fields 232, an instruction field instructing a matching incoming packet to go to a group train n table 118 at reference 234, a timeout field indicating an expiration time being Tn (Tn=Tn−1+$t_n$) at reference 236, and a priority field indicating a value n at reference 238.

It is to be noted that all of the match fields 202, 212, 222, and 232 match to the same values. Thus, an incoming packet either matches with all of the match fields 202, 212, 222, and 232 or it matches with none of the match fields 202, 212, 222, and 232. It is to be designed such that only an initiation packet would match all of the match fields 202, 212, 222, and 232. That is, the initiation packet would trigger the generation of the set of traffic patterns. In one embodiment, the initiation packet is a single packet sent from the network controller to the network element so that the network controller would initiate the generation of the set of traffic patterns.

When the initiation packet is received at the network element, all of the entries 201, 211, 221, and 231 match the initiation packet as the initiation packet matches all of the match fields 202, 212, 222, and 232. When more than one entry matches an incoming packet, the entry with the highest priority takes precedence and will direct the operations of the incoming packet. In this embodiment, the entry 201 has the highest priority, and thus the entry 201 directs the operations of the initiation packet. The entry 201 directs the initiation packet to go to the group initial flow table 112 as instructed at reference 204. The group initial flow table 112 contains an entry (not shown) to direct the initiation packet to a loopback port 120. The initiation packet is then forwarded to the loopback port 120.

The loopback port 120 loops back a packet, e.g., to an input port coupled to a packet processor (not shown) of the network element. Through the loopback port 120, the initiation packet is looped back, so that the packet generation flow table 102 may forward the packet. If the expiration time T0 has not expired, the initiation packet will be recycled again. Through the process, the single initiation packet becomes periodically generated multiple packets. The generated packets may contain the exact same content as the initiation packet or the generated packets may contain an indication that they have been looped back.

It is to be noted that the forwarding to the group initial flow table 112 is not necessary for generating the set of traffic patterns. It is implemented in some embodiments so that it provides an initiation time period, during which other entities involved in a network performance measurement (such as the receiving network element 106 and the network controller 150 when the network element generating the set of traffic patterns is the sending network element 104) prepare to perform the operations needed to perform the network performance measurement. Thus, the duration T0 is to be set so that it is long enough to have all the entities ready for the set of traffic patterns to be generated.

Once the expiration time T0 expires, the generated packets can no longer match to the entry 201 as the entry 201 is no longer valid for matching. Instead, the generated packets will match to the matching entry that is not expired with the next highest priority. In the example of FIG. 3, that matching entry is the entry 211, as priority 1 is the next highest priority. The entry 211 is not expired at T0 as it expires after T1=T0+$t_1$, and thus the entry 211 is a valid entry for matching for a time period $t_1$ after the expiration of the entry 201. As an example illustrated in Table 1, $t_1$ is the time interval during which a first traffic pattern is to be generated (in that example, the load factor $\lambda$=0.5 and number of packets to be generated is 50). Once the generated packets are matched to the entry 211, the generated packets are directed to be forwarded to the group train 1 table 114 as indicated at reference 214.

The group train 1 table 114, similar to the group train 2 table 116 and the group train n table 118, is a group table. A group table contains group table entries (not shown). A group table entry typically contains:

A group identifier: A numeric number (e.g., a 32 bit unsigned integer) uniquely identifying a group.
A group type field: To determine group semantics.
Counters: Updated when packets are processed by a group.
Action buckets: An ordered list of action buckets, where each action bucket contains a set of actions to execute and associated parameters.

A group table may be identified by a group identifier. A group table entry generally allows matching packets to be forwarded to: a random port on a group of ports (for load-balancing), a first live port on a group of ports (for failover), and all ports on a group of ports (for multicasting). Thus, a group table entry allows a network element to dispose a packet to multiple ports. For traffic pattern generation, each of the group train tables (such as the group train 1 table 114, the group train 2 table 116, and the group train n table 118) is set to forward the matching packets to a group of two ports. One of the two ports connects to a traffic shaper, and the other of the two ports connects to a buffer. Thus, each matching packet received at the group table in FIG. 3 is duplicated into two packets, with a packet sent to each of the two ports.

A traffic shaper queues packets and sends the queued packets after an interval. The interval is fixed for all the queued packets, and thus the inter-packet gap between two consecutive packets is typically the same (unless there are not enough packets to be sent). Thus, the traffic shaper may generate uniformly distributed packets. The interval at which the packets are generated from the traffic shaper depends on the load factor $\lambda$ of the traffic pattern in one embodiment. Thus, for two traffic patterns of different load factors, the intervals at which the packets are generated from the corresponding traffic shapers are different too.

Since only the shaped packets are looped back, the network element only has to handle packets at the shaped rate. This rate is no more than the port line rate, and typically the network element can handle packets at or below the line rate without the network element getting overwhelmed.

In this example, traffic shapers such as the shaper 122, the shaper 124, and the shaper 126, each may have a different interval at which the corresponding matching packets are generated. For example, shaper 122 may generate packets at a first interval corresponding to $\lambda=0.5$, and shaper 124 may generate packets at a second interval corresponding to $\lambda=0.1$, as illustrated in the first two entries of table 1. As illustrated in a zoom-in version of the shaper 124, the generated packets at traffic shapers are sent to the loopback port 120 at the respective intervals. The loopback 120 in turn loops back the packets, e.g., to an input port coupled to a packet processor, for processing the looped back packet according to the packet generation flow table 102.

When the expiration time $T_1$ has not expired yet, the packets are generated through the loop of the packet generation flow table 102, the group train 1 table 114, the shaper 122, the loopback port 120, and the packet generation flow table 102 again. The time interval between two consecutive generated packets corresponds to the required inter-packet gap for the traffic pattern.

While the generated packets are generated through the loop in the time interval $t_1$ after time T0, the generated packets are also duplicated to the buffer 132. A buffer in the traffic generation model is where packets are dropped to form a traffic pattern to be transmitted out of the network element. The buffers 132, 134, and 136 serve the same functions of dropping packets, but the rate of dropping packets may be different to form the respective traffic patterns.

As illustrated in a zoom-in version of the buffer 136, a buffer in FIG. 3 randomly drops packets in the buffer to form a desired traffic pattern out of the buffer. One typical implementation to randomly drop packets is referred to as the random early detection (RED). The RED intentionally discards or marks packets as a probabilistic function of queue fullness before overflow conditions are reached. A RED process samples packets waiting on a congested queue, and drops or marks them based on a defined probability. An extension of RED, which is referred to as weighted random early detection (WRED), is commonly used for randomly dropping packets. Through RED, WRED, or other mechanisms to randomly drop packets based on a probability, the traffic out of a buffer may become the desired first traffic pattern. For example, the packets of the buffer 132 may be randomly dropped so that the resulting packet pattern output from the buffer 132 is consistent with the first entry of Table 1 during the time interval $t_1$. Thus, the packets out of the buffer 132 may be sent out of the network element and to the data network under test as the train of packets is consistent with the desired first traffic pattern at the traffic state, $S_1$, where the packets form traffic with a load factor of $\lambda=0.5$, and contain a total of 50 packets, and last the duration of $t_1$.

When the expiration time $T_1$ expires, the generated packets that are looped back to the packet generation flow table 102 can no longer match to the entry 211, and the generated packets match to the matching entry that is not expired with the next highest priority. In the example of FIG. 3, that matching, entry is entry 221 as priority 2 is the next highest priority. The entry 221 is not expired at $T_1$ as it expires only after $T2=T1+t_2$, and thus the entry 221 is a valid entry for matching for time period $t_2$ after the expiration of the entry 211. The generated packets are then forwarded to the group train 2 table 116 as indicated at reference 224, get duplicated to the shaper 124 and the buffer 134, and are then sent to the loopback port 120 and out of the buffer 134, respectively. The generation of the second desired traffic pattern is similar to the generation of the first desired traffic pattern discussed herein above, and thus the generation of the second desired traffic pattern is not repeated here. Depending on how many desirable traffic patterns exist in the set of traffic patterns to be generated, more entries, group train tables, shapers, and buffers (as represented by the entry 231, the group train n table 118, the shaper 126, and the buffer 136) are needed to generate more desirable traffic patterns. For example, in order to implement the set of traffic patterns illustrated in Table 1, ten entries like the entry 211, ten group train tables, ten shapers, and ten buffers are needed.

Through the process, an initiation packet triggers generation of packets to form a set of desired traffic patterns from the network element to be transmitted out of the network element and sent to a data network under test. An embodiment of the invention may utilize known SDN concepts (such as flow tables and group tables) and other functions such as the traffic shaper, the buffer, and the loopback port that can be integrated within the SDN to generate a set of traffic patterns in a network element in a SDN system. Thus the implementation can be in compliance with the SDN standards such as the OpenFlow standards.

Implementation of Loopback Port, Traffic Shaper, and RED

The loopback port, traffic shaper and RED may be implemented in a variety of ways in a SDN system, and this section describes some of the ways.

A loopback port such as the loopback port 120 may be implemented in several ways:

- The loopback may be implemented as an external loopback across two physical ports of a network element, in which case the network element does not need to change its operation in accommodation of the loopback—the loopback can be transparent to the network element in making forwarding decisions.
- The loopback may be implemented as an internal loopback either through a special port or one of the physical ports set in internal loopback mode.
- The loopback may be implemented through a software extension at the network element, where a local port is emulated as a loopback port. In this embodiment, the packet is given a special encapsulation, so that the network element detects that this is a loopback packet and hence will be inserted back to the packet process pipeline at the flow table such as the packet generation flow table 102. In addition, the packet may be delayed a period, so that the packet will be inserted back to the pipeline at the flow table after a recycling time interval.

The traffic shaper may also be implemented in a number of ways:

- A traffic shaper may be attached to the queue associated with the loopback port. Delay of the traffic shaper may be based on the implementation of the loopback port. That is, the protocol for processing packets in a network element (e.g., the OpenFlow specification) does not need to be changed.
- A traffic shaper may be configured through the protocol for processing packets in a network element of a SDN system. For example, a traffic shaper configuration message may be sent from the network controller to configure the delay for a particular loopback port.
- A traffic shaper may be configured using an existing protocol for processing packets in a network element of a SDN system. For example, in OpenFlow Switch Specification 1.3.4, Section 7.2.2, an OpenFlow (OF) switch (i.e., a network element of a SDN system) has a queue, and the queue may be configured with a maximum-rate and a minimum-rate. One may configure this queue using standard OpenFlow messages of queue configuration setting maximum-rate=minimum-rate. This rate can be selected as the required interval between two packets. According to the Specification, the queue length may be configured in bytes, so that the network element may be configured with adequate buffering for the queue, and hence, the recycled packet will always find the place in the queue to get admitted and wait for the time since the recycled packet gets scheduled as per allocated bandwidth for the queue. In this embodiment, the queue works like a delay element and may not need any change of the existing protocol.

The random early detection (RED), as described earlier, may sample packets waiting on a congested queue, and drop or mark them based on a defined probability, say p. The RED can be seen as allowing packets to pass with a probability of 1-p. Thus, in effect, a buffer implementing the RED emulates a Bernoulli traffic source with an arrival probability of 1-p. Each state may have its own RED drop profile. The OpenFlow standards do not provide a construction for probabilistically dropping packets, and embodiments of the invention may use a group table to implement a buffer for RED. The group table contains an OpenFlow SELECT group entry. The SELECT group entry contains two buckets:

Bucket 1: The action of a first bucket is to send a packet out of the buffer. The packet is then sent out of the network element implementing the buffer.

Bucket 2: The action of a second bucket is to drop the packet.

When the RED is implemented as an extension of RED, the weighted RED (WRED), the weight is based on the drop probability. For example, for a state $S_i$ where the drop probability is $P_i$, the weight of bucket 1 can be set to be $100*(1-P_i)$, and the weight of bucket 2 can be set to be $100*P_i$.

In the OpenFlow standard, for example, OpenFlow 1.3.1, Section 5.6.1 "Group Type" does not specify any algorithm describing how packets are to be distributed across the buckets. It is left to the implementation in the switch (an implementation of a network element). Generally, switches implement a hash (typically a hash based on packet headers such as the standard 5-tuple) such that a given flow is pinned to one bucket. This is to avoid sending packets belonging to the same flow on different buckets, which can cause packet re-ordering problems. Such an implementation cannot be used for dropping packets at a buffer discussed herein above. If that flow is pinned to one bucket there would be either a 100% drop or 100% no-drop. Thus, the embodiments of the invention propose a different implementation.

When a packet needs to be processed according to a group entry, the network element generates a random number R between ranges 1 to X. If $R/X \leq P_i$, then bucket 2 is chosen and the packet is dropped; if $R/X > P_i$, then bucket 1 is chosen and the packet is sent out of the network element.

Embodiments to Scale

According to the embodiments discussed in relation to FIG. 3, the matching entries for traffic pattern generation in the packet generation flow table are differentiated through the priority fields as the matching entries contain the same values in the match fields. The priority field contains a limited number of bits. For example, in the OpenFlow standard, the priority field contains two bytes. Thus, there are $2^{16}$=64 k traffic patterns that can be generated. This is insufficient for a long sequence of traffic patterns containing more than 64 k traffic patterns. In addition, maintaining all the flow table entries for generating a set of traffic patterns can consume a large amount of memory/storage space in the network element. Thus, in one embodiment, only a small number of entries are maintained in a network element. The network controller may update the entries in the packet generation flow table when needed.

In one embodiment, the packet generation flow table initially contains only entries corresponding to first few traffic patterns in a set of traffic patterns. For example, when the set of 10 traffic patterns is to be generated according to Table 1, the packet generation flow table may contain only the entries for the first two traffic patterns. In that embodiment, entry 231 is not created initially.

The process of packet matching can start with an initiation packet, and packets are generated through the entry 201 and entry 211. Once time $T_1$ expires, the packets are matched to the entry 221. At that time, a message (e.g., a PACKET_IN message) is sent to the network controller, indicating that entry 211 expired. The network controller then responds to the network element with information to add an entry for the third traffic pattern in the set of traffic patterns. Then, once time $T_2$ expires, the packets are matched to the newly generated entry for the third traffic pattern. Similarly, the network element will add an entry for the fourth traffic pattern with information received from the network controller upon $T_2$ expiration. Thus, with the smaller number of entries, the traffic pattern generation can still be maintained.

It is to be noted that there is some latency between an entry expiring on the network element and a new entry being added. For example, the latency includes the time for the entry expiration event to reach the network controller, the processing time in the network controller, the time for a message (e.g., Flow_Mod message) to add an entry to be sent from the network controller to the network element, and the time for the network element to create the new entry. If the latency is more than an entry's lifetime, keeping entries for only two traffic patterns is not sufficient. In that case, the network element needs to keep entries for more traffic patterns, so that the latency will be shorter than the combination of the lifetimes of the kept multiple entries.

Flow Diagrams

Figure 4:
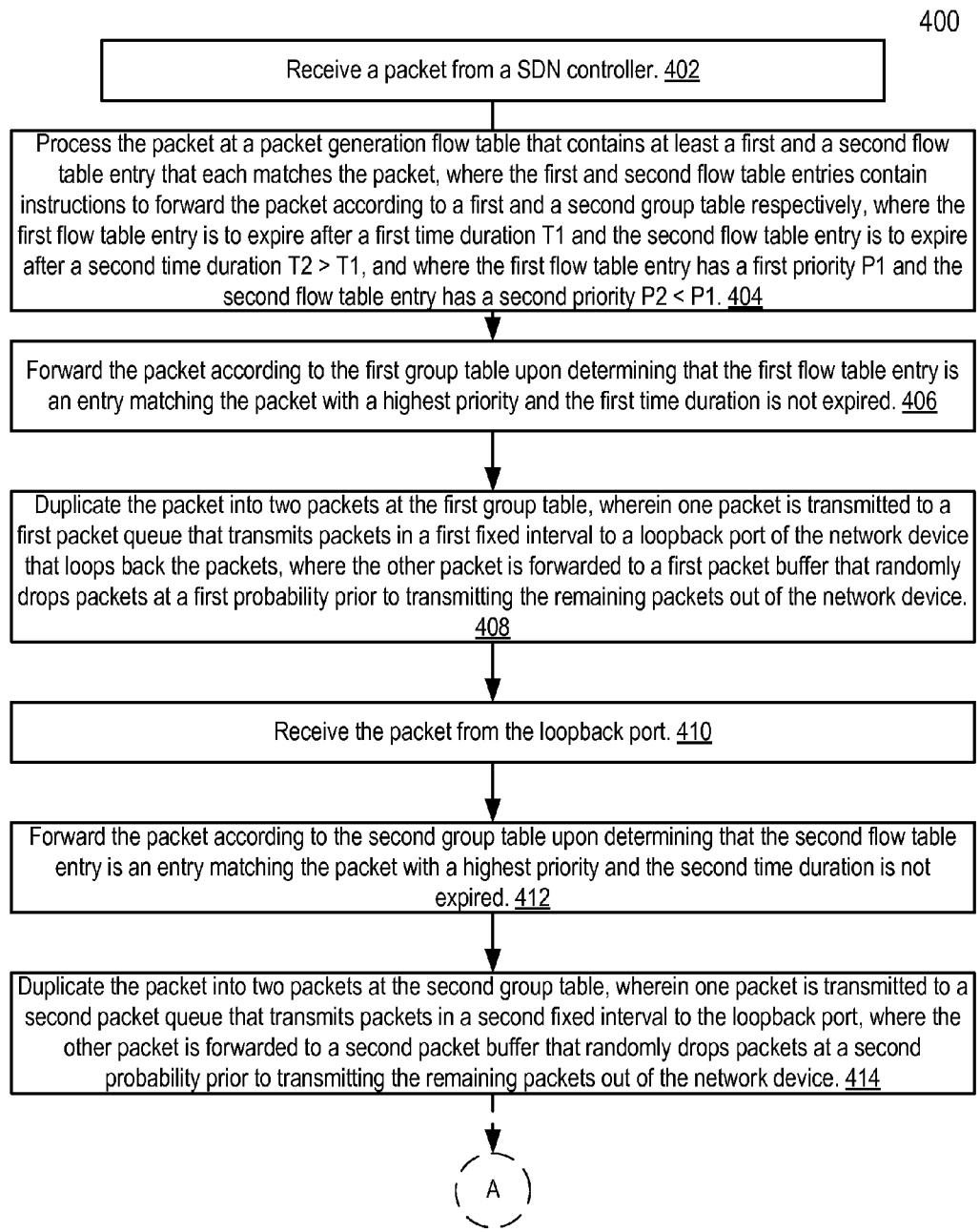
FIG. 4 is a flow diagram illustrating the operations of traffic pattern generation according to one embodiment of the invention.

FIG. 4 is a flow diagram illustrating the operations of traffic pattern generation according to one embodiment of the invention. Method 400 is implemented in a network device, which may implement one or more network elements of a SDN system, and the SDN system contains a SDN controller (also referred to as network controller, and the two terms are used interchangeably).

At reference 402, a packet is received from the SDN controller at the network element. The packet is the initiation packet discussed herein above in one embodiment. The initiation packet is sent through a packet out message in compliance with the OpenFlow standards in one embodiment.

At reference 404, the network element processes the packet according to a packet generation flow table that contains at least a first and a second flow table entry that each matches the packet. The first and second flow table entries contain instructions to forward the packet according to a first and a second group table respectively. The first flow table entry is to expire after a first time duration and the second flow table entry is to expire after a second time duration longer than the first time duration. Additionally, the first flow table entry has a first priority and the second flow table entry has a second priority lower than the first priority.

At reference 406, the network element forwards the packet according to the first group table upon determining that the first flow table entry is an entry matching the packet with a highest priority and the first time duration is not expired. Then at reference 408, the network element duplicates the packet into two packets at the first group table. One of the two packets is transmitted to a first packet queue that transmits packets in a first fixed interval to a loopback port that loops back the packets. The first packet queue is a traffic shaper that sends out packets at the inter-packet gap of the first fixed interval to the loopback port. The other of the two packets is forwarded to a first packet buffer that randomly drops packets at a first probability prior to transmitting the remaining packets out of the network device. If the packet passes the random drop, it will be sent out of the network device. The first interval may be selected based on a predetermined Markov modulated Poisson process that describes a level of traffic to be generated as discussed herein above.

At reference 410, the packet is received from the loopback port. The packet generation flow table is utilized again to determine how to forward the packet. Upon determining that the second flow table entry is an entry matching the packet with a highest priority and the second time duration is not expired, the network element then forwards the packet according to the second group table at reference 412. The network element duplicates the packet into two packets at the second group table, where one packet is transmitted to a second packet queue that transmits packets in a second fixed interval to the loopback port, while the other packet is forwarded to a second packet buffer that randomly drops packets at a second probability prior to transmitting the remaining packets out of the network device. The second packet queue and the second interval are similar to the first packet queue and the first interval.

As discussed herein above in relation to FIG. 3, the packet generation flow table may contain another flow table entry that matches the packet, where the other flow table entry (entry 201 as illustrated) contains instructions to forward the packet to the loopback port. The third flow table entry is to expire after a time duration shorter than the first time duration, and the other flow table entry has a priority higher than the first priority.

The implementations of the loopback port, the first and second queues, and the random packet drop are described herein above and thus not repeated here.

Figure 5:
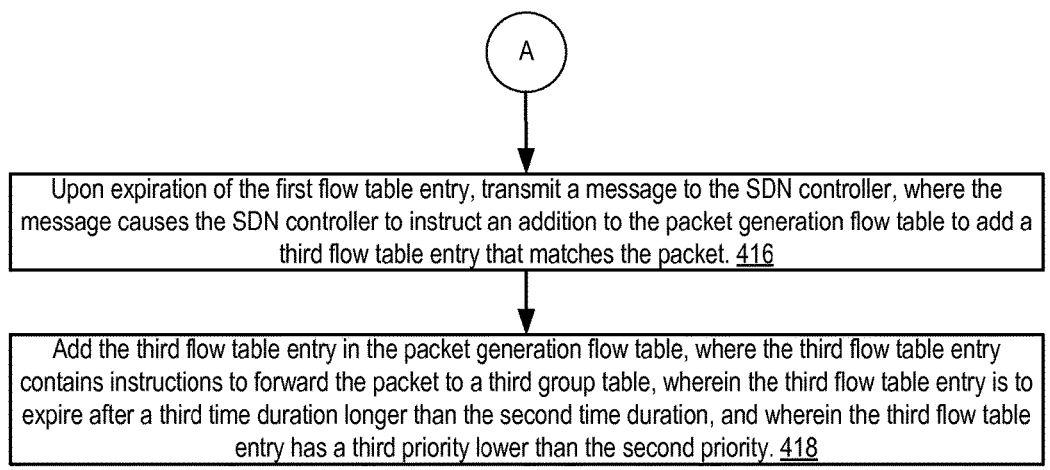
FIG. 5 illustrates adding a flow table entry in a flow table for a traffic pattern according to one embodiment of the invention.

As discussed herein above, in one embodiment, the packet generation flow table may not contain all the entries for the set of traffic patterns. In that case, method 400 optionally extends to FIG. 5, which illustrates adding a flow table entry in a flow table for a traffic pattern according to one embodiment of the invention.

At reference 416, upon expiration of the first flow table entry, the network device transmits a message to the SDN controller, where the message causes the SDN controller to instruct through an instruction to add to the packet generation flow table a third flow table entry that matches the packet. Then at reference 418, the network element adds the third flow table entry in the packet generation flow table. The third flow table entry contains instructions to forward the packet to a third group table, where the third flow table entry is to expire after a third time duration longer than the second time duration, and where the third flow table entry has a third priority lower than the second priority. In one embodiment, the instruction from the SDN controller is a flow modification message in compliance with the OpenFlow standards.

SDN and NFV Environment Utilizing Embodiment of the Invention

Embodiments of the invention may be utilized in a SDN and/or NFV network containing network devices. FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). The networking software 620 includes traffic pattern generation module 111 to perform operations as discussed herein above in relation to FIGS. 1-5 in one embodiment. The control communication and configuration module 632A-632R each may contain an instance of traffic pattern generation module such as TPG instances 621A and 621R.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the network software 620 to instantiate one or more sets of one or more applications 664A-R. The networking software 620 includes traffic pattern generation (TPG) 111 to perform operations as discussed herein above in relation to FIGS. 1-5 in one embodiment. While one embodiment does not implement virtualization, alternative embodiments may use different forms of virtualization—represented by a virtualization layer 654 and software containers 662A-R. For example, one such alternative embodiment implements operating system-level virtualization, in which case the virtualization layer 654 represents the kernel of an operating system (or a shim executing on a base operating system) that allows for the creation of multiple software containers 662A-R that may each be used to execute one of the sets of applications 664A-R. In this embodiment, the multiple software containers 662A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 654 represents a hypervisor (sometimes referred to as a virtual machine monitor (VMM)) or a hypervisor executing on top of a host operating system; and 2) the software containers 662A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 664A-R, as well as the virtualization layer 654 and software containers 662A-R if implemented, are collectively referred to as software instance(s) 652. Each set of applications 664A-R, corresponding software container 662A-R if implemented, and that part of the hardware 640 that executes them (be it hardware dedicated to that execution and/or time slices of hardware temporally shared by software containers 662A-R), forms a separate virtual network element(s) 660A-R.

The virtual network element(s) 660A-R perform similar functionality to the virtual network element(s) 630A-R— e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 662A-R differently. For example, while embodiments of the invention are illustrated with each software container 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 662A-R to VNEs also apply to embodiments where such a finer level of granularity is used.

In certain embodiments, the virtualization layer 654 includes a virtual switch that provides similar forwarding services as a physical Ethernet switch. Specifically, this virtual switch forwards traffic between software containers 662A-R and the NIC(s) 644, as well as optionally between the software containers 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 6C:
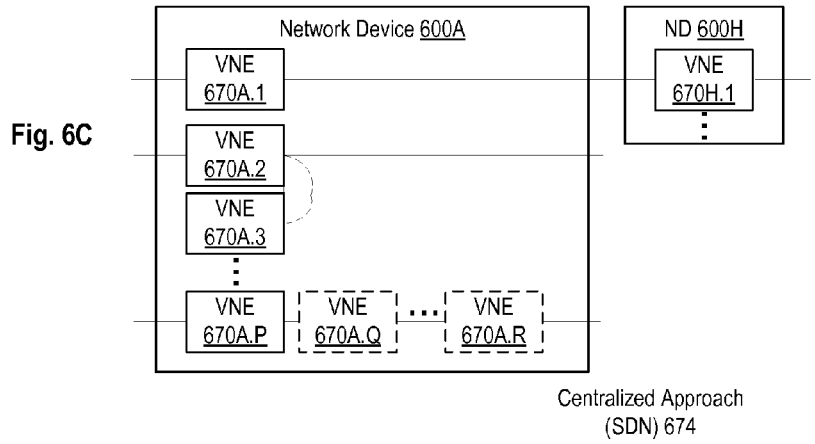
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service/function chaining, where each of the VNEs in the series of VNEs provides a different service/function—e.g., one or more layer 4-7 network services/functions). While FIG. 6C illustrates various exemplary relationships between the VNEs, alternative embodiments may support other relationships (e.g., more/fewer VNEs, more/fewer dynamic service/function chains, multiple different dynamic service/function chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, tablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software containers 662A-R may operate as servers; the same would be true for the hybrid network device 606; in the case of the special-purpose network device 602, one or more such servers could also be run on a virtualization layer executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 6D:
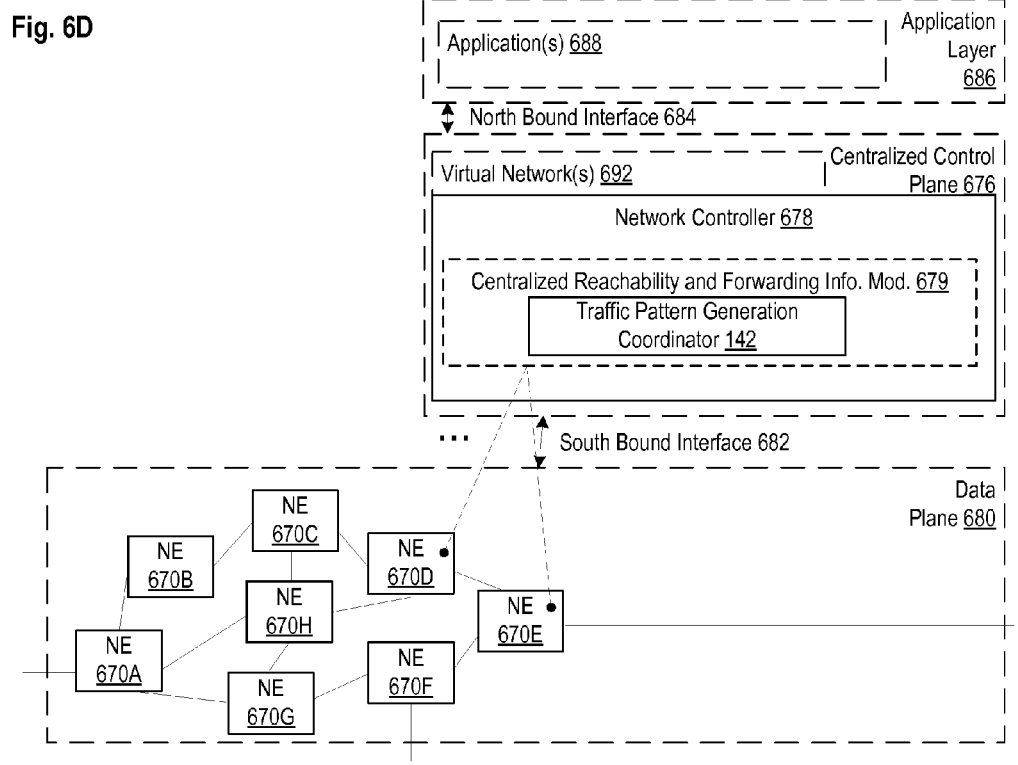
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs. In one embodiment, centralized reachability and forwarding information module 679 includes traffic pattern generation coordinator 142, which sends an initiation packet to trigger the start of the traffic pattern generation and coordinates with NDs to generate flow tables and group table for the traffic pattern generation.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
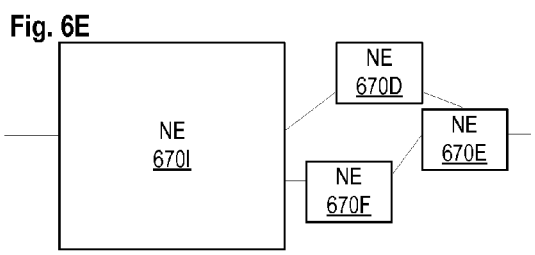
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
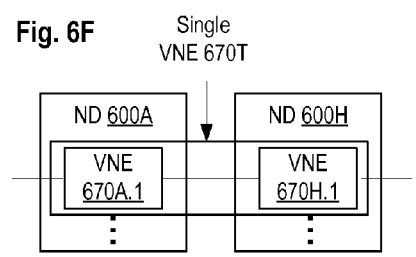
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network device coupled to a software-defined networking (SDN) system, wherein the SDN system contains a SDN controller managing the network device, the method comprising:
   receiving a packet from the SDN controller;
   processing the packet according to a packet generation flow table that contains at least a first and a second flow table entry that each matches the packet, wherein the first and second flow table entries contain instructions to forward the packet according to a first and a second group table respectively, wherein the first flow table entry is to expire after a first time duration and the second flow table entry is to expire after a second time duration longer than the first time duration, and wherein the first flow table entry has a first priority and the second flow table entry has a second priority lower than the first priority;
   forwarding the packet according to the first group table upon determining that the first flow table entry is an entry matching the packet with a highest priority and the first time duration is not expired;
   duplicating the packet into two packets at the first group table, wherein one packet is transmitted to a first packet queue that transmits packets in a first fixed interval to a loopback port of the network device that loops back the packets, wherein the other packet is forwarded to a first packet buffer that randomly drops packets at a first probability prior to transmitting the remaining packets out of the network device;
   receiving the packet from the loopback port;
   forwarding the packet according to the second group table upon determining that the second flow table entry is an entry matching the packet with a highest priority and the second time duration is not expired; and
   duplicating the packet into two packets at the second group table, wherein one packet is transmitted to a second packet queue that transmits packets in a second fixed interval to the loopback port, wherein the other packet is forwarded to a second packet buffer that randomly drops packets at a second probability prior to transmitting the remaining packets out of the network device.

2. The method of claim 1, wherein the packet is a packet out message in compliance with the OpenFlow standards.

3. The method of claim 1, wherein the packet generation flow table contains a third flow table entry that matches the packet, wherein the third flow table entry contains instructions to forward the packet to the loopback port, wherein the third flow table entry is to expire after a third time duration shorter than the first time duration, and wherein the third flow table entry has a third priority higher than the first priority.

4. The method of claim 1, wherein the loopback port is a logical port with emulated loopback functions.

5. The method of claim 1, wherein the first and second packet queues are configured with a maximum rate being equal to a minimum rate in compliance with the OpenFlow standards.

6. The method of claim 1, wherein packets in the first and second packet buffers are dropped through applying a weighted random early detection (WRED) algorithm.

7. The method of claim 1, wherein each of the first and second packet buffers is associated with a group table that contains at least a group table entry with a group type of select, wherein the group table entry contains instructions that cause selection of one of two buckets based on a probability.

8. The method of claim 1, wherein the first and second fixed interval are selected based on a predetermined Markov modulated Poisson process that describes a level of traffic to be generated by the network device.

9. The method of claim 1, further comprising:
   upon expiration of the first flow table entry, transmitting a message to the SDN controller, wherein the message causes the SDN controller to instruct an addition to the packet generation flow table of a third flow table entry that matches the packet; and
   adding the third flow table entry in the packet generation flow table, wherein the third flow table entry contains instructions to forward the packet to a third group table, wherein the third flow table entry is to expire after a third time duration longer than the second time duration, and wherein the third flow table entry has a third priority lower than the second priority.

10. The method of claim 9, wherein the instruction from the SDN controller to add the third flow table entry to the packet generation flow table is a flow modification message in compliance with the OpenFlow standards.

11. A network device, to be coupled to a software-defined networking (SDN) system, wherein the SDN system contains a SDN controller managing the network device, the network device comprising:
   a processor and a non-transitory machine-readable storage medium coupled to the processor, the non-transitory machine-readable storage medium containing operations executable by the processor, wherein the network device is operative to:
   receive a packet from the SDN controller,
   process the packet according to a packet generation flow table that contains at least a first and a second flow table entry that each matches the packet, wherein the first and second flow table entries contain instructions to forward the packet according to a first and a second group table respectively, wherein the first flow table entry is to expire after a first time duration and the second flow table entry is to expire after a second time duration longer than the first time duration, and wherein the first flow table entry has a first priority and the second flow table entry has a second priority lower than the first priority,
   forward the packet according to the first group table upon determining that the first flow table entry is an entry matching the packet with a highest priority and the first time duration is not expired,
   duplicate the packet into two packets at the first group table, wherein one packet is transmitted to a first packet queue that transmits packets in a first fixed interval to a loopback port of the network device that loops back the packets, wherein the other packet is forwarded to a first packet buffer that randomly drops packets at a first probability prior to transmitting the remaining packets out of the network device,
   receive the packet from the loopback port,
   forward the packet according to the second group table upon determining that the second flow table entry is an entry matching the packet with a highest priority and the second time duration is not expired, and
   duplicate the packet into two packets at the second group table, wherein one packet is transmitted to a second packet queue that transmits packets in a second fixed interval to the loopback port, wherein the other packet is forwarded to a second packet buffer that randomly drops packets at a second probability prior to transmitting the remaining packets out of the network device.

12. The network device of claim 11, wherein the loopback port is a logical port with emulated loopback functions.

13. The network device of claim 11, wherein the first and second packet queues are configured with a maximum rate being equal to a minimum rate in compliance with the OpenFlow standards.

14. The network device of claim 11, wherein each of the first and second packet buffers is associated with as a group table that contains at least a group table entry with a group type of select, wherein the group table entry contains instructions that cause selection of one of two buckets based on a probability.

15. The network device of claim 11, where the network device is further operative to:
    upon expiration of the first flow table entry, transmit a message to the SDN controller, wherein the message causes the SDN controller to instruct an addition to the packet generation flow table of a third flow table entry that matches the packet, and
    add the third flow table entry in the packet generation flow table, wherein the third flow table entry contains instructions including forwarding the packet to a third group table, wherein the third flow table entry is to expire after a third time duration longer than the second time duration, and wherein the third flow table entry has a third priority lower than the second priority.

16. A non-transitory machine-readable storage medium having instructions stored therein, which when executed by a processor, cause the processor to perform operations in a network device, the operations comprising:
    receiving a packet from a software-defined networking (SDN) controller;
    processing the packet according to a packet generation flow table that contains at least a first and a second flow table entry that each matches the packet, wherein the first and second flow table entries contain instructions to forward the packet according to a first and a second group table respectively, wherein the first flow table entry is to expire after a first time duration and the second flow table entry is to expire after a second time duration longer than the first time duration, and wherein the first flow table entry has a first priority and the second flow table entry has a second priority lower than the first priority;
    forwarding the packet according to the first group table upon determining that the first flow table entry is an entry matching the packet with a highest priority and the first time duration is not expired;
    duplicating the packet into two packets at the first group table, wherein one packet is transmitted to a first packet queue that transmits packets in a first fixed interval to a loopback port of the network device that loops back the packets, wherein the other packet is forwarded to a first packet buffer that randomly drops packets at a first probability prior to transmitting the remaining packets out of the network device;
    receiving the packet from the loopback port;
    forwarding the packet according to the second group table upon determining that the second flow table entry is an entry matching the packet with a highest priority and the second time duration is not expired; and
    duplicating the packet into two packets at the second group table, wherein one packet is transmitted to a second packet queue that transmits packets in a second fixed interval to the loopback port, wherein the other packet is forwarded to a second packet buffer that randomly drops packets at a second probability prior to transmitting the remaining packets out of the network device.

17. The non-transitory machine-readable storage medium of claim 16, wherein the packet generation flow table contains a third flow table entry that matches the packet, wherein the third flow table entry contain instructions to forward the packet to the loopback port, wherein the third flow table entry is to expire after a third time duration shorter than the first time duration, and wherein the third flow table entry has a third priority higher than the first priority.

18. The non-transitory machine-readable storage medium of claim 16, wherein the first and second packet queues are configured with a maximum rate being equal to a minimum rate in compliance with the OpenFlow standards.

19. The non-transitory machine-readable storage medium of claim 16, wherein packets in the first and second packet buffers are dropped through applying a weighted random early detection (WRED) algorithm.

20. The non-transitory machine-readable storage medium of claim 16, wherein the first and second fixed interval are selected based on a predetermined Markov modulated Poisson process that describes a level of traffic to be generated by the network device.

* * * * *